(12) United States Patent
Marathe et al.

(10) Patent No.: US 8,700,570 B1
(45) Date of Patent: Apr. 15, 2014

(54) ONLINE STORAGE MIGRATION OF REPLICATED STORAGE ARRAYS

(75) Inventors: Shailesh Vaman Marathe, Maharashtra (IN); Niranjan Pendharkar, Pune (IN)

(73) Assignee: Symantec Corporation, Mountain View, CA (US)

( * ) Notice: Subject to any disclaimer, the term of this patent is extended or adjusted under 35 U.S.C. 154(b) by 108 days.

(21) Appl. No.: 13/082,642

(22) Filed: Apr. 8, 2011

(51) Int. Cl.
G06F 17/30 (2006.01)
(52) U.S. Cl.
USPC .......................................................... 707/634
(58) Field of Classification Search
None
See application file for complete search history.

(56) References Cited

U.S. PATENT DOCUMENTS

| | | | |
|---|---|---|---|
| 7,484,059 B1* | 1/2009 | Ofer et al. ...................... | 711/162 |
| 7,925,749 B1* | 4/2011 | Lin et al. ....................... | 709/225 |
| 2003/0041074 A1* | 2/2003 | Vasudevan et al. ........... | 707/204 |
| 2008/0005507 A1* | 1/2008 | Madnani et al. .............. | 711/161 |
| 2008/0080497 A1* | 4/2008 | Meijer et al. .................. | 370/389 |
| 2010/0077169 A1* | 3/2010 | Pace .............................. | 711/165 |

* cited by examiner

*Primary Examiner* — Dinku Gebresenbet
(74) *Attorney, Agent, or Firm* — Campbell Stephenson LLP

(57) ABSTRACT

Various systems and methods for migrating replicated storage arrays. For example, one method can involve transferring a set of data from a first storage device to a second storage device. The method also involves terminating a replication relationship between the first storage device and establishing a new replication relationship between the second storage device and either the third storage device or a fourth storage device. Between the time that the replication relationship with the first storage device is terminated and the new replication relationship with the second storage device is established, the second storage device receives a plurality of change operations. The method involves applying the change operations to either the third storage device or fourth storage device.

20 Claims, 5 Drawing Sheets

ONLINE STORAGE MIGRATION OF REPLICATED STORAGE ARRAYS

FIELD OF THE INVENTION

This invention relates to data migration and, more particularly, to migrating replicated data from a first storage array to a second storage array.

DESCRIPTION OF THE RELATED ART

In such a case, it becomes desirable to migrate data from a first array (a source array) to a second array (a destination array). For example, if a storage array is to be taken out of service, it may be desirable to migrate all data off of the storage array and onto another storage array. Once all data is migrated from a source array to a destination array, the source array can be taken out of service. Migration can be performed online or offline. During an online migration, the data stored in the array is still accessible, for example, to an application. Accessing data while the data is being migrated can lead to data inconsistencies. Techniques exist to ensure that online migration does not cause data inconsistency.

In some cases, a replication relationship can exist between two storage arrays. When a replication relationship exists between two storage arrays, changes to data in a first array, the primary array, are replicated to a second array, the secondary array. This means that two copies of a data set exist, one in the primary, and one in the secondary replica. This can be advantageous for disaster recovery, load balancing and the like. Migrating data from a storage array affects any replication relationship the storage array is a part of. Consider an example where the source storage array is part of a replication relationship with a secondary storage array. For a replication relationship to continue to function after data is migrated from the source storage array to a destination storage array, the replication relationship should also be transferred from source storage array to the destination storage array. This allows changes made to the destination storage array to be replicated. Once all data is migrated, the storage array can be taken out of service and the replication relationship can be transferred to the destination storage array. Transferring the replication relationship introduces the possibility of data inconsistency. For example, if an update is directed to the destination storage array before the replication relationship is established between the destination storage array and the secondary storage array, the update may not be replicated to the secondary storage array. Techniques to avoid the possibility of inconsistency, such as taking applications offline or performing full initial synchronization between the primary and the secondary can negatively impact performance.

SUMMARY OF THE INVENTION

Various systems and methods for migrating replicated storage arrays are disclosed. For example, one method can involve transferring a set of data from a first storage device to a second storage device. The transferring can be performed by a storage manager in response to receiving a migration request from a volume manager.

The method also involves terminating a replication relationship between the first storage device and establishing a new replication relationship between the second storage device and either the third storage device or a fourth storage device. Between the time that the replication relationship with the first storage device is terminated and the new replication relationship with the second storage device is established, the second storage device receives a plurality of change operations. The change operations can be directed to a plurality of regions.

After the new replication relationship is established, the change operations are applied to either the third storage device or the fourth storage device. The method can involve enabling delta tracking prior to terminating the first replication relationship and disabling delta tracking once the new replication relationship is established. In response to detecting that the change operations have been applied to the third storage device or fourth storage device, the method involves indicating that the third storage device or fourth storage device is consistent. Applying the changes comprises reading a data item from each region of the plurality of regions change operations are directed to and writing the data item to each region of the plurality of regions from which the data item was read In an embodiment, the first storage device and the second storage device are implemented as storage arrays in a primary replication site, and the third storage device and the fourth storage devices are implemented as storage arrays in a secondary replication site. The method can also involve establishing a mirror relationship between the first storage device and the second storage device such that writes to the first storage device are propagated to the second storage device. Once all data has been transferred from the first storage device to the second storage device, the mirror relationship can be terminated. The method can also involve establishing a mirror relationship between the third storage device and the fourth storage device such that writes to the third storage device are propagated to the fourth storage device. Once all data has been transferred from the third storage device to the fourth storage device, the mirror relationship can be terminated.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
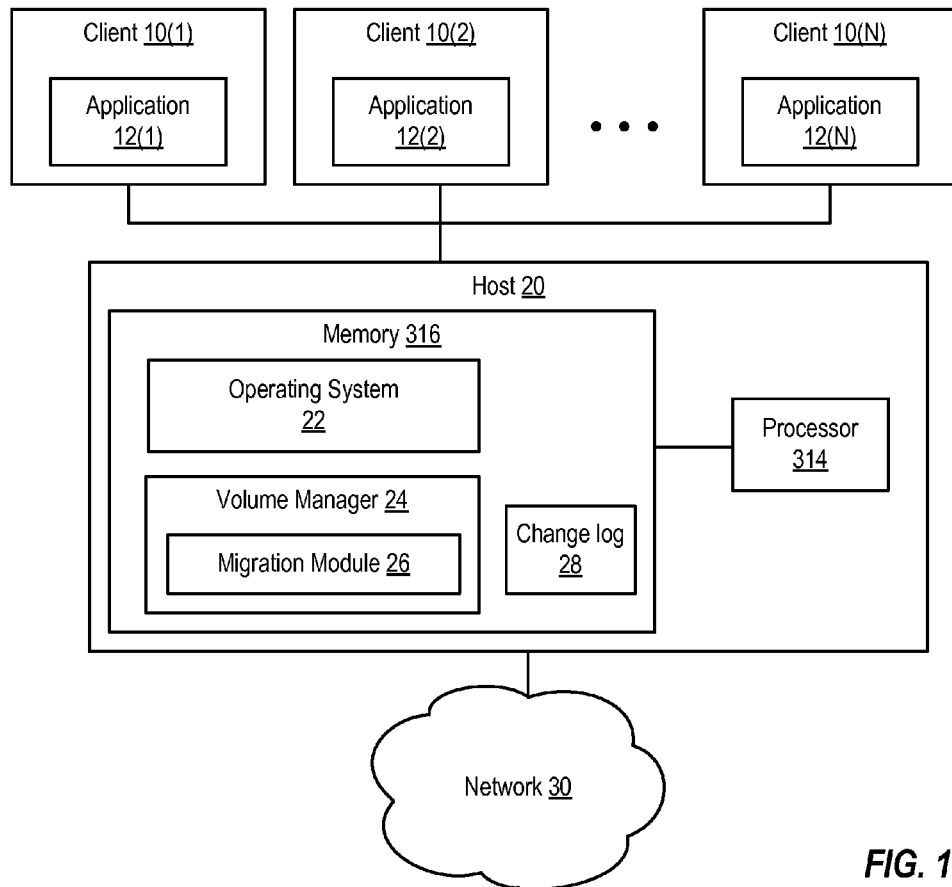
FIG. 1 is a block diagram of a system that performs online storage migration from a replicated source, according to one embodiment of the present invention.
Figure 1:
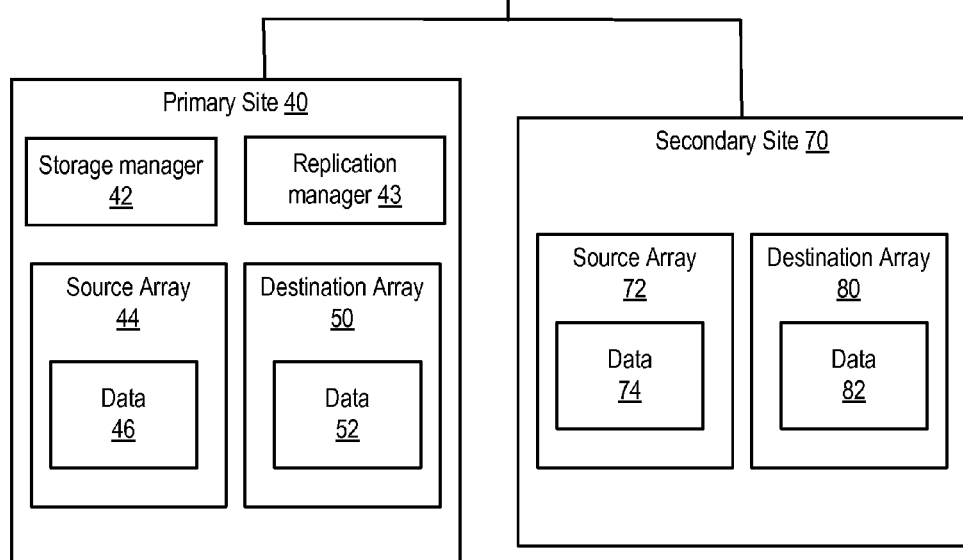

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A volume manager is configured to capture data updates that occur to a first storage array while a replication relationship is being established between the first storage array and a replica storage array. In an embodiment, the replication relationship is being transferred from a second storage array where all data stored in the second storage array has been migrated to the first storage array. The migration and transfer of the replication relationship are performed online, meaning that the data can still be accessed during the migration and transfer of the replication relationship. Any updates that occur during these processes are captured by the volume manager, thus ensuring that the online migration does not lead to data inconsistency.

FIG. 1 is a block diagram of a system that performs online storage migration in a replication environment. As shown, the system includes clients 10(1)-10(N) coupled to a host 20, which is coupled to a primary site 40 and secondary site 70 by a network 30. Network 30 can include a WAN (Wide Area Network), such as the Internet, one or more LANs (Local Area Networks), and/or one or more SANs (Storage Area Networks). In an embodiment, host 20 can include and/or be coupled (e.g., via a bus, network, or other appropriate interconnect) to primary site 40 and secondary site 70. Clients 10 can be coupled to host 20 by a network. Host 20 is a computing device such as a personal computer, laptop computer, server, personal digital assistant, cell phone, or the like. Host 20 includes at least one processor 314 and a memory 316.

Memory 316 stores program instructions executable by processor 314 to implement an operating system 22, a volume manager 24, and a change log 28. Volume manager includes a migration module 26.

Clients 10(1)-10(N) include applications 12(1)-12(N), respectively. Applications 12 can include word processing programs, email programs, graphic editing programs, database applications, or the like. Applications 12 access (e.g., by generating and/or consuming) data in primary site 40.

Primary site 40 includes a storage manager 42 and a replication manager 43. Primary site 40 also includes storage arrays 44 and 50, which include data 46 and 52, respectively. Secondary site 70 includes storage arrays 72 and 80, which include data 74 and 82, respectively. The storage arrays provide persistent data storage, such that data stored in the storage arrays will remain stored even after the storage arrays are powered off. The storage arrays can include one or more storage devices such as, for example, solid state drives, hard disks, compact discs (CDs), digital versatile discs (DVDs), sequential access media (e.g., tape storage), or other mass storage devices, or storage systems (e.g., redundant array of independent disks (RAID) systems or optical storage jukeboxes). The storage arrays can also include one or more types of storage media, including solid state media (e.g., flash drives), optical media (e.g., CDs and DVDs), and magnetic media (e.g., hard disks or magnetic tape). In an embodiment, the storage arrays can be implemented using cloud storage, in which the storage arrays include logical storage devices to which physical storage device(s) are allocated on an as-needed and/or as-contracted basis.

Storage manager 42 provides storage management functions, such as controlling migration operations. Storage manager 42 can receive a command from volume manager 24 to perform a migration operation from source array 44 to destination array 50. Volume manager 24 can specify that all or a portions of a storage array be migrated. In response to receiving the command to migrate data from source array 44 to destination array 50, storage manager 42 can establish a mirror relationship between source array 44 and destination array 50 such that any update that is received at source array 44 while the data migration is ongoing is applied to both source array 44 and destination array 50. Mirroring means that updates to source array 44 are not considered complete until storage manager 42 has also applied the updates to destination array 50. An update to source array 44 is synchronously reproduced at destination array 50 before storage manager 42 acknowledges to volume manager 24 that the update is complete.

Storage manager 42 can initiate a background copy operation that performs the migration from source array 44 to destination array 50. The background copy operation involves reading data from each location in source array 44 and copying the data to a corresponding location in destination array 50. When the migration is complete, storage manager 42 can provide information to volume manager 24 indicating completion of the migration operation.

During the migration, storage manager 42 ensures that each copy operation is atomic. An atomic copy operation occurs such that when the background copy process copies data from a location in the source array to a location in the destination array, storage manager 42 prevents an update from occurring to the location in the destination array that the data is to be copied to. This prevents the background copy operation from overwriting or nullifying an update to the location being copied. One way to ensure atomicity is for storage manager 42 to lock a location being copied from as well as the location being copied to for the duration of the copy operation. Storage manager 44 can release the lock in response to detecting that the data has been copied.

Replication manager 43 performs tasks associated with replication. In an embodiment, replication manager 43 can establish a replication relationship between a storage array in primary site 40, e.g., array 44, and a storage array in secondary site 70, e.g., array 72. In response to application 12 issuing a data update, client 10 sends the update to host 20 and host 20 transmits the data update to storage manager 42. Replication manager 43 stores the data update in data 46 and copies, or replicates, the data update to data 74 in array 72. Replication manager 43 can replicate the data update synchronously or asynchronously. If asynchronous replication is used, replication manager 43 keeps a list of information that identifies data updates that are waiting to be applied to data 74. In response to receiving an acknowledgement that a given data update is applied to data 74, storage manager 42 then removes information identifying the data update from the list. Replication manager 43 can establish a checkpoint on primary site 40. When replication manager 43 replicates the checkpoint to secondary site 70, the replication operation is complete and replication manager 43 can indicate that secondary site 70 is consistent with primary site 40. In an embodiment, the list of pending updates is implemented as a bitmap. Array 72 is a consistent replica of array 44. This means that while updates may lag, as in the case of asynchronous replication, array 72 will never reflect a state that did not at one time exist in array 44. Updates to array 72 occur in the same sequence as they occurred in array 72.

Replication manager 43 can also terminate a replication relationship between source array 44 and source array 72. For example, after data is migrated from source array 44 to destination array 50, replication manager 43 can terminate the replication relationship between source array 44 and source array 72. Updates to source array 44 that occur subsequent to termination of the replication relationship are not applied to source array 72.

Replication manager 43 can establish a replication relationship between destination array 50 and source array 72 and replication manager 43 can take source array 44 out of service or cease updating any data in source array 44. Replication manager 43 can provide volume manager 24 with information indicating that a replication relationship has been transferred from array 44 to array 50. When replication manager 43 establishes a replication relationship between array 50 and array 72, replication manager 43 can specify that the replication relationship does not require a full initial synchronization, e.g., by including a NOCOPY option in the command to establish the replication relationship.

In an embodiment, storage manager 42 can initiate a migration operation between source array 72 and destination array 80 in secondary site 70. Replication manager 43 can terminate a replication relationship between source array 44 and source array 72 and after data is migrated from source array 44 to destination array 50 and from source array 72 to destination array 80, establish a replication relationship between destination array 50 and destination array 80.

Volume manager 24 provides host-level storage virtualization. Volume manager 24 presents a logical view of storage space available to applications 12. Applications 12 are unaware of the underlying physical storage space, e.g., storage space in array 44. Volume manager 24 represents such storage space as logical volumes identified by logical unit number (LUN). Operating system 22 can grant applications 12 permission to access, e.g., read and write to, a given LUN. Applications 12 see the LUN as a physical storage device and perform I/O operations directed to regions of the LUN.

Volume manager 24 communicates with storage manager 42 to perform online migration. Volume manager 24 can initiate a migration operation by sending a command to storage manager 42. Volume manager 24 can specify that the storage for a particular LUN or portions of a particular LUN be migrated. Volume manager 24 can transmit information to storage manager 42 that identifies the LUNs from which data is to be migrated from. Storage manager 42 can maintain a map that provides a logical to physical translation between the regions as seen by volume manager 42 and the physical locations as seen by storage manager 42. Using this map, storage manager 42 can identify which locations in the storage arrays correspond to a region or regions identified by volume manager 24. If all data in source array 44 is to be migrated, storage manager 42 instructs array 44 to copy data 46 to data 52 in array 50. Volume manager 24 can establish a mirror by instructing storage manager 42 that while the migration is ongoing, any data updates to data 46 that volume manager 24 sends to storage manager 42 should be applied to both data 46 and data 52. Since array 44 is in a replication relationship with array 72, replication manager 43 applies any updates to data 46 that are processed while migration is ongoing to data 46 and data 74, thus keeping array 72 a consistent replica of array 44. The updates are also applied to data 52, so when the migration is complete, array 50 is consistent with array 44. During the migration operation, reads can be processed from source array 44.

Volume manager 24 can detect when a migration operation completes. In an embodiment, storage manager 42 sends information to volume manager 24 indicating that the migration operation is complete. In response to detecting that storage manager 42 has completed migration of data from source array 44 to destination array 52, volume manager can instruct storage manager 42 that subsequent updates be applied to destination array 50 only, and not to source array 44. This breaks the mirror relationship between source array 44 and destination array 50.

Once migration is complete, replication manager 43 can transfer a replication relationship from source array 44 to destination array 50. This means that updates to source array 44 are no longer replicated to source array 72. Instead, updates to destination array 50 are replicated to source array 72. While the transfer is ongoing, migration module 26 captures updates to destination array 50 to ensure data consistency. For example, if application 12 directs a write operation to a given region, migration module 26 can detect the write operation and can store information identifying which region the update is directed to. To ensure updates are captured, volume manager 24 can inform migration module 26 that the migration is complete. In response to detecting that storage manager 42 has completed migration of data from source array 44 to destination array 52, migration module 26 can begin tracking updates to destination array 50. Migration module 26 stores information identifying such updates in change log 28. Change log 28 can be implemented as a bitmap. In such a case, migration module 26 marks a bit in a bitmap corresponding to a region that is updated by application 12. Alternatively, change log 28 can be a list of regions, e.g., volume addresses, or any other mechanism to identify regions in the volume and/or underlying storage array that are updated while migration module 26 is tracking updates.

During the time between the termination of the replication relationship between storage array 44 and storage array 72 and the establishment of the replication relationship between storage array 50 and storage array 72, migration module 26 tracks updates that occur. Migration module 26 stores in change log 28 information identifying regions that are targeted by application 12 for update. Volume manager 24 detects that replication manager 43 has established a replication relationship between array 50 and array 72. In an embodiment, volume manager 24 receives an indication that the replication relationship is established from replication manager 43. In response to receiving the indication, volume manager 24 marks array 72 as inconsistent.

Volume manager 24 can cause data in each region identified in change log 28 to be replicated by issuing commands to storage manager 42 to read the data in the location(s) that correspond to the identified region, and then write the data to the same location(s) the data was read from. This causes replication manager 43 to replicate the data from array 50 to array 72 without changing the data. In response to detecting that data in a region is replicated, migration manager 26 can remove the information identifying the region from change log 28. Once all regions have been replicated, volume manager 24 can mark array 72 as consistent.

Without migration module 26 capturing updates that occur during transferring of a replication relationship, ensuring data consistency during data migration would likely cause significant negative impacts on performance. To preclude the possibility of missing an update, one could perform a full initial synchronization between the new primary array and the secondary array. The full initial synchronization ensures that when the replication relationship is established between the new primary array and the secondary array, the primary array and secondary array are consistent. However, this full initial synchronization can involve copying relatively large amounts of data, which can negatively impact system performance by consuming processor and transmission bandwidth. The full initial synchronization can also be a time consuming operation, and can present challenges relating to how to handle updates that occur to the primary array during the full initial synchronization.

Another alternative is to bring down any applications that may update data in the storage array while the replication relationship is being transferred from the old primary array to the new primary array. This technique also can have negative impacts on system performance. While the application is offline, users may be unable to complete tasks. Ideally, the migration would be transparent to users. When the migration is transparent, the users are unable to tell that a migration is being performed, and there is no loss in data consistency.

Figure 2:
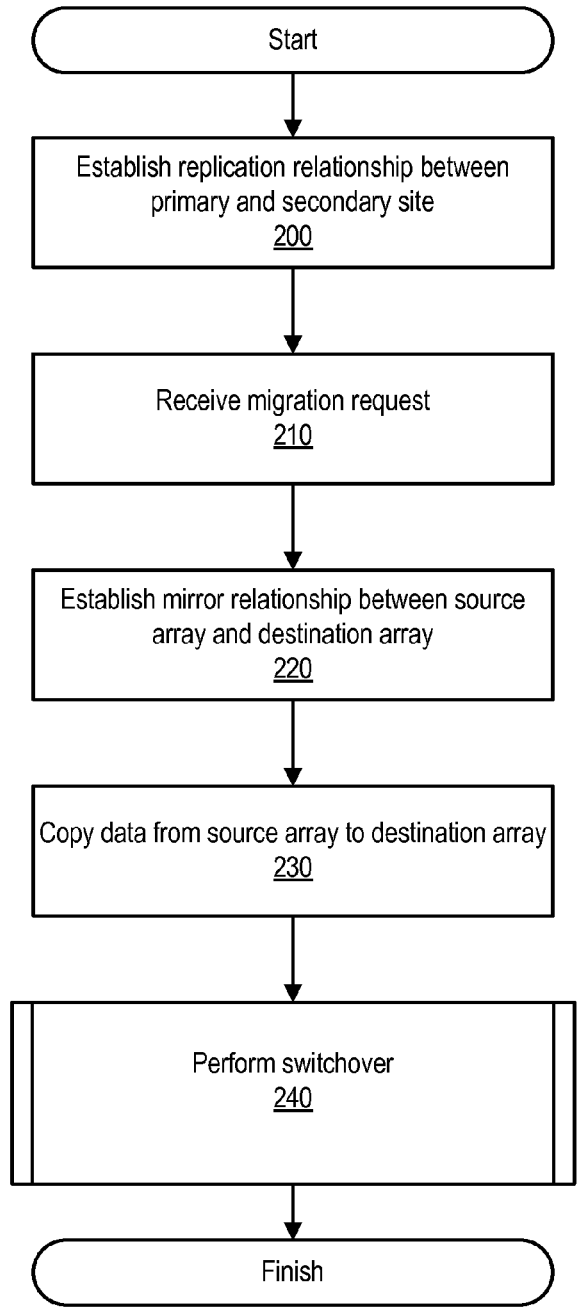
FIG. 2 is a flowchart of a method of performing online storage migration from a replicated source, according to one embodiment of the present invention.

FIG. 2 is a flowchart of a method of performing online storage migration. This method can be performed by a computing system that implements a migration module, such as migration module 26 of FIG. 1.

The method begins at 200, where a replication manager, such as replication manager 43 of FIG. 1, establishes a replication relationship between a primary site, e.g., primary site 40 of FIG. 1, and a secondary site, e.g., secondary site 70 of FIG. 1. While the replication relationship exists, some or all updates made to data stored in a primary array at the primary site, e.g., source array 44 at primary site 40, are replicated to a secondary array at the secondary site, e.g., source array 72 at secondary site 70. For example, when an application updates a file, the update is passed by a volume manager, such as volume manager 24 of FIG. 1, to the primary array where the file data is stored. The primary array can apply the update to the data and acknowledge that the update has been applied. The acknowledging can involve sending information to the volume manager indicating that the update is complete. Then, the primary array can copy the data to the secondary array, either immediately, or after some delay. The data can be sent in an individual transaction or can be aggregated with other updated data and sent as a batch. Sending the data to the secondary ensures that the secondary array will comprise a consistent copy of the primary array such that transactions, e.g., reads and writes, can be processed by either the primary array or the secondary array.

At 210, the storage manager receives a migration request. In an embodiment, a storage manager, such as storage manager 42 of FIG. 1, receives the migration request from a volume manager. The migration request specifies that data in a source array, e.g., data 46 in source array 44 of FIG. 1, be copied to a destination array, e.g., to data 52 in destination array 50 of FIG. 1.

The migration request can also specify that the storage manager initiate a migration operation in the secondary site. In response to the migration request, the storage manager can cause data in a source array in the secondary site, e.g., data 74 in source array 72 of FIG. 1, to be copied to a destination array in the secondary site, e.g., to data 82 in destination array 80.

At 220, the storage manager can establish a mirror relationship between the source array and the destination array. This means that that any updates received during the migration are applied to both the source and destination arrays. The storage manager does not acknowledge to the volume manager that the update is complete until the update has been applied to both the source array and the destination array. The storage manager can establish a mirror relationship between the source array and the destination array in the primary site. The storage manager can also establish a mirror relationship between the source array and the destination array in the secondary site.

The storage manager initiates a background copy operation at 230. The background copy operation copies all data from the source array to the destination array. When the background copy operation finishes copying the data from the source array to the destination array, the migration operation is complete. Once the migration operation is complete, the storage manager can notify the volume manager that the migration is complete and then perform a switchover at 240. The switchover is described in more detail with reference to FIG. 3.

Figure 3:
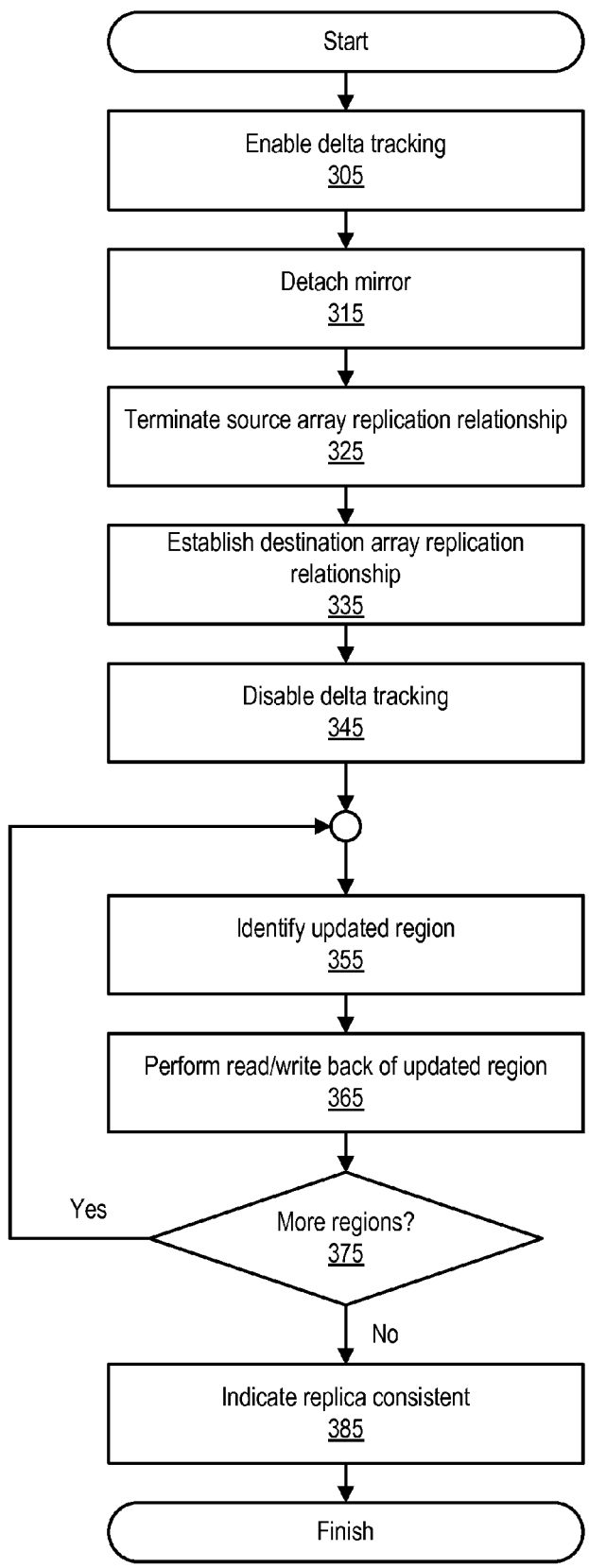
FIG. 3 is a flowchart showing further details of a method of performing online storage migration from a replicated source, according to one embodiment of the present invention.

FIG. 3 is a flowchart showing additional details of a method of performing online storage migration. The method begins at 305, where a volume manager, e.g., volume manager 24 of FIG. 1, enables delta tracking. Delta tracking means that a migration module, e.g., migration module 26 of FIG. 1, keeps track of regions in a volume that are updated, e.g. by an application, such as application 12 of FIG. 1. The migration module can store information indicating the address of the updated regions in a change log, such as change log 28 of FIG. 1. In an embodiment, the volume manager enables delta tracking in response to receiving an indication from a storage manager, such as storage manager 42 of FIG. 1, that a migration operation is complete.

At 315, the volume manager instructs the storage manager to detach the mirror. This involves terminating a mirror relationship between a source array, e.g., source array 44 of FIG. 1, and a destination array, e.g., destination array 50 of FIG. 1. Subsequent to detaching the mirror, updates received by the storage manager are applied only to the destination array and not to both the source array and destination array.

At 325, the volume manager instructs a replication manager, such as replication manager 43 of FIG. 1, to terminate the replication relationship between a primary array, e.g., source array 44 of FIG. 1, in a primary site, e.g., primary site 40 of FIG. 1, and a secondary array, e.g., source array 72 of FIG. 1, in a secondary site, e.g., secondary site 70 of FIG. 1. The primary array was the source array of a data migration operation, as discussed with regard to FIG. 2. At this point, updates applied to the primary site, e.g., to the destination array that was the destination array of the migration operation discussed with regard to FIG. 2, are not replicated to the secondary site. However, the migration module keeps tracks of regions that are updated during this time. For example, if an application, e.g., application 12 of FIG. 1, sends a data update which the volume manager passes to the primary (destination) array, the migration module stores information identifying the region that is updated.

At 335, the volume manager instructs the replication manager to establish a replication relationship between an array, e.g., destination array 50 of FIG. 1, in the primary site and an array, e.g., source array 72 of FIG. 1, in the secondary site. In an embodiment where data has been migrated in the secondary site from source array 72 to destination array 80, the replication manager can instead establish the replication relationship between destination array 50 and destination array 80. Once the replication relationship has been established, updates to a storage array in the primary site are replicated, either synchronously or asynchronously to an array in the secondary site. The replication manager establishes the replication relationship without performing a full initial synchronization between the primary site and the secondary site and without bringing any application offline that has access to the data stored in the primary array and/or the secondary array. The replication manager can send information to the volume manager indicating that the replication relationship has been established.

At 345, the volume manager disables delta tracking. This can be done in response to receiving the information from the replication manager indicating that the new replication relationship has been established between the primary site and secondary site.

At 355, the volume manager identifies a region that was updated during the switchover. In an embodiment, this involves accessing the change log. The change log identifies all regions that were updated while delta tracking was enabled. The change log can be implemented as a bitmap, a list of addresses, or any in any other form that allows the volume manager to identify updated regions.

At 365, the volume manager instructs the storage manager to perform a read/write back operation of data at the updated region. The storage manager can identify, e.g., using logical-to-physical mapping information, one or more physical addresses that identify locations corresponding to an updated region. The storage manager performs a read operation of the locations identified from the change log, and then writes back the data that was just read to the locations. In response to detecting the data being written, the storage manager replicates the data from the primary site to the secondary site. The migration module can detect that the region has been replicated and remove the information identifying the region from the change log. This can involve, for example, clearing a bit in a bitmap or deleting an entry in a list.

At 375, the volume manager detects whether there are additional updated regions identified in the change log. If so, the method returns to 355 and another region is selected. If there are no additional regions that were updated but not replicated, the volume manager indicates the replica is consistent, at 385, and the method ends.

Figure 4:
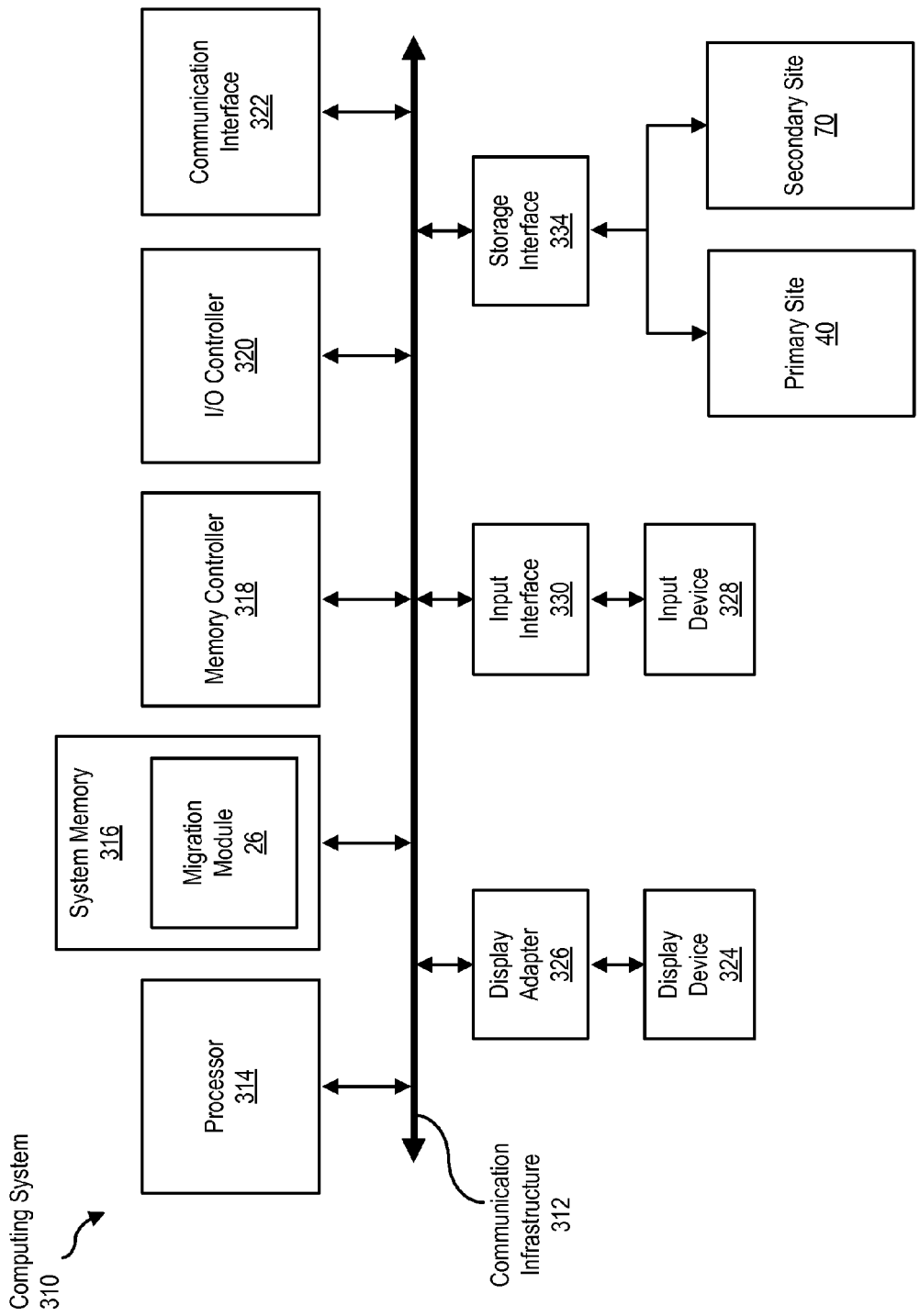
FIG. 4 is a block diagram of a computing device, illustrating how a migration module can be implemented in software, according to one embodiment of the present invention.

FIG. 4 is a block diagram of a computing system 310 capable of performing online storage migration as described above. Computing system 310 broadly represents any single or multi-processor computing device or system capable of executing computer-readable instructions. Examples of computing system 310 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 310 may include at least one processor 314 and a system memory 316. By executing the software that implements a migration module 26, computing system 310 becomes a special purpose computing device that is configured to perform online storage migration.

Processor 314 generally represents any type or form of processing unit capable of processing data or interpreting and executing instructions. In certain embodiments, processor 314 may receive instructions from a software application or module. These instructions may cause processor 314 to perform the functions of one or more of the embodiments described and/or illustrated herein. For example, processor 314 may perform and/or be a means for performing the operations described herein. Processor 314 may also perform and/or be a means for performing any other operations, methods, or processes described and/or illustrated herein.

System memory 316 generally represents any type or form of volatile or non-volatile storage device or medium capable of storing data and/or other computer-readable instructions. Examples of system memory 316 include, without limitation, random access memory (RAM), read only memory (ROM), flash memory, or any other suitable memory device. Although not required, in certain embodiments computing system 310 may include both a volatile memory unit (such as, for example, system memory 316) and a non-volatile storage device (such as, for example, storage array 20, as described in detail below). In one example, program instructions executable to implement a migration module 26 (e.g., as shown in FIG. 1) may be loaded into system memory 316.

In certain embodiments, computing system 310 may also include one or more components or elements in addition to processor 314 and system memory 316. For example, as illustrated in FIG. 4, computing system 310 may include a memory controller 318, an Input/Output (I/O) controller 320, and a communication interface 322, each of which may be interconnected via a communication infrastructure 312. Communication infrastructure 312 generally represents any type or form of infrastructure capable of facilitating communication between one or more components of a computing device. Examples of communication infrastructure 312 include, without limitation, a communication bus (such as an Industry Standard Architecture (ISA), Peripheral Component Interconnect (PCI), PCI express (PCIe), or similar bus) and a network.

Memory controller 318 generally represents any type or form of device capable of handling memory or data or controlling communication between one or more components of computing system 310. For example, in certain embodiments memory controller 318 may control communication between processor 314, system memory 316, and I/O controller 320 via communication infrastructure 312. In certain embodiments, memory controller 318 may perform and/or be a means for performing, either alone or in combination with other elements, one or more of the operations or features described and/or illustrated herein.

I/O controller 320 generally represents any type or form of module capable of coordinating and/or controlling the input and output functions of a computing device. For example, in certain embodiments I/O controller 320 may control or facilitate transfer of data between one or more elements of computing system 310, such as processor 314, system memory 316, communication interface 322, display adapter 326, input interface 330, and storage interface 334.

Communication interface 322 broadly represents any type or form of communication device or adapter capable of facilitating communication between computing system 310 and one or more additional devices. For example, in certain embodiments communication interface 322 may facilitate communication between computing system 310 and a private or public network including additional computing systems. Examples of communication interface 322 include, without limitation, a wired network interface (such as a network interface card), a wireless network interface (such as a wireless network interface card), a modem, and any other suitable interface. In at least one embodiment, communication interface 322 may provide a direct connection to a remote server via a direct link to a network, such as the Internet. Communication interface 322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 322 may also represent a host adapter configured to facilitate communication between computing system 310 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 322 may also allow computing system 310 to engage in distributed or remote computing. For example, communication interface 322 may receive instructions from a remote device or send instructions to a remote device for execution.

As illustrated in FIG. 4, computing system 310 may also include at least one display device 324 coupled to communication infrastructure 312 via a display adapter 326. Display device 324 generally represents any type or form of device capable of visually displaying information forwarded by display adapter 326. Similarly, display adapter 326 generally represents any type or form of device configured to forward graphics, text, and other data from communication infrastructure 312 (or from a frame buffer, as known in the art) for display on display device 324.

As illustrated in FIG. 4, computing system 310 may also include at least one input device 328 coupled to communication infrastructure 312 via an input interface 330. Input device 328 generally represents any type or form of input device capable of providing input, either computer or human generated, to computing system 310. Examples of input device 328 include, without limitation, a keyboard, a pointing device, a speech recognition device, or any other input device.

As illustrated in FIG. 4, computing system 310 may also include a primary site 40 and secondary site 70 coupled to communication infrastructure 312 via a storage interface 334. Primary site 40 and secondary site 70 generally include any type or form of storage device or medium capable of storing data and/or other computer-readable instructions. For example, primary site 40 and secondary site 70 may include one or more of a magnetic disk drive (e.g., a so-called hard drive), a floppy disk drive, a magnetic tape drive, an optical disk drive, a flash drive, or the like. Storage interface 334 generally represents any type or form of interface or device for transferring data between primary site 40 and secondary site 70 and other components of computing system 310. Storage devices like those of primary site 40 and secondary site 70 can perform online migration in a replicated environment.

In certain embodiments, primary site 40 and secondary site 70 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Primary site 40 and secondary site 70 may also include other similar structures or devices for allowing computer software, data, or other computer-readable instructions to be loaded into computing system 310. For example, primary site 40 and secondary site 70 may be configured to read and write software, data, or other computer-readable information. Primary site 40 and secondary site 70 may also be a part of computing system 310 or may be separate systems accessed through other interface systems.

Many other devices or subsystems may be connected to computing system 310. Conversely, all of the components and devices illustrated in FIG. 4 need not be present to practice the embodiments described and/or illustrated herein. The devices and subsystems referenced above may also be interconnected in different ways from that shown in FIG. 4.

Computing system 310 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 310 for storage in memory via a network such as the Internet or upon a carrier medium.

The computer-readable medium containing the computer program may be loaded into computing system 310. All or a portion of the computer program stored on the computer-readable medium may then be stored in system memory 316 and/or various portions of storage devices 332 and 333. When executed by processor 314, a computer program loaded into computing system 310 may cause processor 314 to perform and/or be a means for performing the functions of one or more of the embodiments described and/or illustrated herein. Additionally or alternatively, one or more of the embodiments described and/or illustrated herein may be implemented in firmware and/or hardware. For example, computing system 310 may be configured as an application specific integrated circuit (ASIC) adapted to implement one or more of the embodiments disclosed herein.

Figure 5:
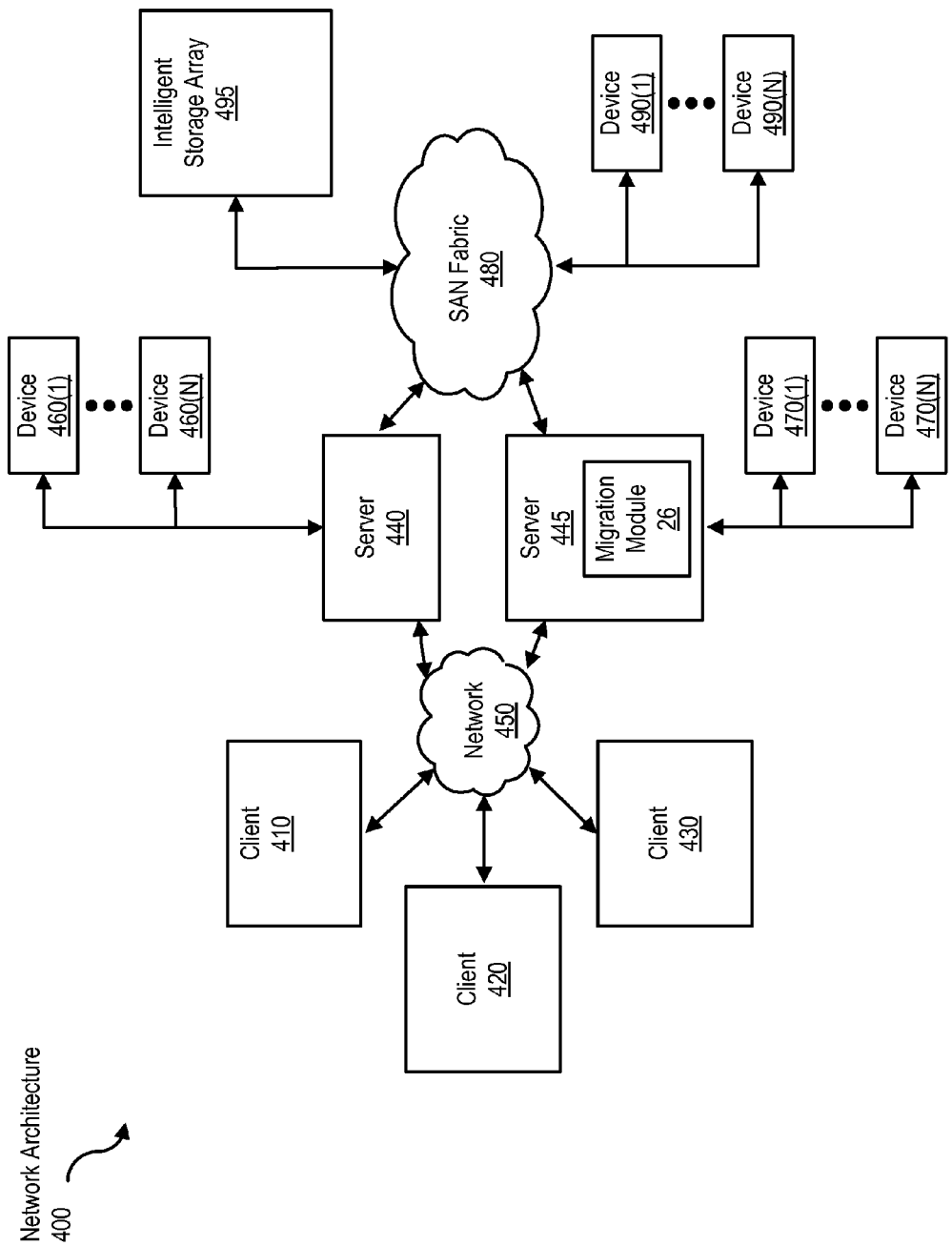
FIG. 5 is a block diagram of a networked system, illustrating how various computing devices can communicate via a network, according to one embodiment of the present invention.

FIG. 5 is a block diagram of a network architecture 400 in which client systems 410, 420, and 430 and servers 440 and 445 may be coupled to a network 450. Client systems 410, 420, and 430 generally represent any type or form of computing device or system, such as computing system 310 in FIG. 4.

Similarly, servers 440 and 445 generally represent computing devices or systems, such as application servers or database servers, configured to provide various database services and/or run certain software applications. Network 450 generally represents any telecommunication or computer network including, for example, an intranet, a wide area network (WAN), a local area network (LAN), a personal area network (PAN), or the Internet. In one example, one or more of client systems 410, 420, and/or 430 may include a migration module 26 as shown in FIG. 1.

As illustrated in FIG. 5, one or more storage devices 440(1)-(N) may be directly attached to server 440. Similarly, one or more storage devices 470(1)-(N) may be directly attached to server 445. Storage devices 440(1)-(N) and storage devices 470(1)-(N) generally represent any type or form of storage device or medium capable of storing data and/or other computer-readable instructions. In certain embodiments, storage devices 440(1)-(N) and storage devices 470(1)-(N) may represent network-attached storage (NAS) devices configured to communicate with servers 440 and 445 using various protocols, such as Network File System (NFS), Server Message Block (SMB), or Common Internet File System (CIFS). Such storage devices can store deduplication signatures, backup images and/or backup catalogs, as described above.

Servers 440 and 445 may also be connected to a storage area network (SAN) fabric 480. SAN fabric 480 generally represents any type or form of computer network or architecture capable of facilitating communication between multiple storage devices. SAN fabric 480 may facilitate communication between servers 440 and 445 and a plurality of storage devices 490(1)-(N) and/or an intelligent storage array 495. SAN fabric 480 may also facilitate, via network 450 and servers 440 and 445, communication between client systems 410, 420, and 430 and storage devices 490(1)-(N) and/or intelligent storage array 495 in such a manner that devices 490(1)-(N) and array 495 appear as locally attached devices to client systems 410, 420, and 430. As with storage devices 440(1)-(N) and storage devices 470(1)-(N), storage devices 490(1)-(N) and intelligent storage array 495 generally represent any type or form of storage device or medium capable of storing data and/or other computer-readable instructions.

In certain embodiments, and with reference to computing system 310 of FIG. 4, a communication interface, such as communication interface 322 in FIG. 4, may be used to provide connectivity between each client system 410, 420, and 430 and network 450. Client systems 410, 420, and 430 may be able to access information on server 440 or 445 using, for example, a web browser or other client software. Such software may allow client systems 410, 420, and 430 to access data hosted by server 440, server 445, storage devices 440 (1)-(N), storage devices 470(1)-(N), storage devices 490(1)-(N), or intelligent storage array 495. Although FIG. 5 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 440, server 445, storage devices 440(1)-(N), storage devices 470(1)-(N), storage devices 490(1)-(N), intelligent storage array 495, or any combination thereof. All or a portion of one or more of the embodiments disclosed herein may also be encoded as a computer program, stored in server 440, run by server 445, and distributed to client systems 410, 420, and 430 over network 450.

In some examples, all or a portion of one of the systems in FIGS. 1, 4, and 5 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a migration module may transform the behavior of a volume manager such that a storage array's performance is less negatively impacted due to online migration operations performed by the storage array. The volume manager may detect information that indicates a location has been updated and record the information in a change log in memory.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
performing a migration operation, wherein
the performing comprises transferring a set of data from a first storage device to a second storage device;
terminating a replication relationship between the first storage device and a third storage device at a first time in response to detecting that the migration operation is complete;
establishing a replication relationship between the second storage device and the third storage device at a second time in response to detecting that the migration operation is complete;
in response to the establishing the replication relationship between the second storage device and the third storage device, identifying the third storage device as inconsistent with respect to the second storage device;
receiving a plurality of change operations at the second storage device between the first time and the second time; and
applying the change operations to the third storage device after the second time.

2. The method of claim 1, wherein
the first storage device and the second storage device comprise storage arrays in a primary replication site, and
the third storage device and a fourth storage devices comprise storage arrays in a secondary replication site.

3. The method of claim 1, wherein
the transferring is performed by a storage manager in response to receiving a migration request from a volume manager.

4. The method of claim 1, further comprising:
enabling delta tracking, wherein
the delta tracking is enabled in response to determining that the migration operation is complete, and
the delta tracking is enabled prior to the terminating;
disabling delta tracking subsequent to the establishing, wherein
the disabling is performed in response to the establishing the replication relationship between the second storage device and the third storage device; and
storing information regarding the plurality of change operations in a change log.

5. The method of claim 1, further comprising:
establishing a mirror relationship between the first storage device and the second storage device such that writes to the first storage device are propagated to the second storage device; and
terminating the mirror relationship between the first storage device and the second storage device in response to detecting all data is copied from the first storage device to the second storage device.

6. The method of claim 1, further comprising:
establishing a mirror relationship between the third storage device and a fourth storage device such that writes to the third storage device are redirected to the fourth storage device; and
terminating the mirror relationship between the third storage device and the fourth storage device in response to detecting all data is copied from the third storage device to the fourth storage device.

7. The method of claim 1, further comprising:
indicating that the third storage device is consistent in response to the applying the change operations to the third storage device.

8. The method of claim 1, wherein
the change operations are directed to a plurality of regions, and
applying the changes comprises reading a data item from each region of the plurality of regions and writing the data item to each region of the plurality of regions from which the data item was read.

9. A non-transitory computer readable storage medium storing program instructions executable to:
perform a migration operation, wherein
performing the migration operation comprises transferring a set of data from a first storage device to a second storage device;
terminate a replication relationship between the first storage device and a third storage device at a first time in response to detecting that the migration operation is complete;
establish a replication relationship between the second storage device and the third storage device at a second time in response to detecting that the migration operation is complete;
in response to the establishing the replication relationship between the second storage device and the third storage device, identify the third storage device as inconsistent with respect to the second storage device;
receive a plurality of change operations at the second storage device between the first time and the second time; and
apply the change operations to the third storage device after the second time.

10. The computer readable storage medium of claim 9, wherein
the first storage device and the second storage device comprise storage arrays in a primary replication site, and
the third storage device and a fourth storage devices comprise storage arrays in a secondary replication site.

11. The computer readable storage medium of claim 9, wherein
transferring the set of data is performed by a storage manager in response to receiving a migration request from a volume manager.

12. The computer readable storage medium of claim 9, wherein the program instructions are further executable to:
enable delta tracking, wherein
the delta tracking is enabled in response to determining that the migration operation is complete, and
the delta tracking is enabled prior to the terminating;
disable delta tracking subsequent to the establishing, wherein
the disabling is performed in response to the establishing the replication relationship between the second storage device and the third storage device; and
store information regarding the plurality of change operations in a change log.

13. The computer readable storage medium of claim 9, wherein the program instructions are further executable to:
establish a mirror relationship between the first storage device and the second storage device such that writes to the first storage device are propagated to the second storage device; and
terminate the mirror relationship between the first storage device and the second storage device in response to detecting all data is copied from the first storage device to the second storage device.

14. The computer readable storage medium of claim 9, wherein the program instructions are further executable to:
establish a mirror relationship between the third storage device and a fourth storage device such that writes to the third storage device are redirected to the fourth storage device; and
terminate the mirror relationship between the third storage device and the fourth storage device in response to detecting all data is copied from the third storage device to the fourth storage device.

15. The computer readable storage medium of claim 9, wherein the program instructions are further executable to:
indicate that the third storage device is consistent in response to the applying the change operations to the third storage device.

16. The computer readable storage medium of claim 9, wherein the change operations are directed to a plurality of regions, and
applying the changes comprises reading a data item from each region of the plurality of regions and writing the data item to each region of the plurality of regions from which the data item was read.

17. A system comprising:
one or more processors; and
a memory coupled to the one or more processors, wherein the memory stores program instructions executable by the one or more processors to:
perform a migration operation, wherein
performing the migration operation comprises transferring a set of data from a first storage device to a second storage device;
terminate a replication relationship between the first storage device and a third storage device at a first time in response to detecting that the migration operation is complete;
establish a replication relationship between the second storage device and the third storage device at a second time in response to detecting that the migration operation is complete;
in response to the establishing the replication relationship between the second storage device and the third storage device, identify the third storage device as inconsistent with respect to the second storage device;
receive a plurality of change operations at the second storage device between the first time and the second time; and
apply the change operations to the third storage device after the second time.

18. The system of claim 17, wherein
the first storage device and the second storage device comprise storage arrays in a primary replication site, and
the third storage device and a fourth storage devices comprise storage arrays in a secondary replication site.

19. The system of claim 17, wherein
transferring the set of data is performed by a storage manager in response to receiving a migration request from a volume manager.

20. The system of claim 17, wherein the program instructions are further executable to:
enable delta tracking, wherein
the delta tracking is enabled in response to determining that the migration operation is complete, and
the delta tracking is enabled prior to the terminating;
disable delta tracking subsequent to the establishing, wherein
the disabling is performed in response to the establishing the replication relationship between the second storage device and the third storage device; and
storing information regarding the plurality of change operations in a change log.

* * * * *